United States Patent
Breinig et al.

(10) Patent No.: US 11,020,692 B2
(45) Date of Patent: Jun. 1, 2021

(54) SYSTEM FOR FILTERING FLUIDS

(71) Applicant: HYDAC PROCESS TECHNOLOGY GMBH, Neunkirchen (DE)

(72) Inventors: Markus Breinig, Frechen (DE); Sebastian Hrin, Elsdorf (DE); Hans-Juergen Lingen, Moenchengladbach (DE)

(73) Assignee: HYDAC PROCESS TECHNOLOGY GMBH, Neunkirchen (DE)

( * ) Notice: Subject to any disclaimer, the term of this patent is extended or adjusted under 35 U.S.C. 154(b) by 493 days.

(21) Appl. No.: 15/545,403

(22) PCT Filed: Feb. 24, 2016

(86) PCT No.: PCT/EP2016/000317
§ 371 (c)(1),
(2) Date: Jul. 21, 2017

(87) PCT Pub. No.: WO2016/138983
PCT Pub. Date: Sep. 9, 2016

(65) Prior Publication Data
US 2018/0008913 A1 Jan. 11, 2018

(30) Foreign Application Priority Data
Mar. 5, 2015 (DE) ...................... 10 2015 002 767.0

(51) Int. Cl.
*B01D 29/66* (2006.01)
*B01D 29/52* (2006.01)
*B01D 29/56* (2006.01)

(52) U.S. Cl.
CPC .......... *B01D 29/665* (2013.01); *B01D 29/52* (2013.01); *B01D 29/56* (2013.01); *B01D 29/668* (2013.01);

(Continued)

(58) Field of Classification Search
CPC ........ B01D 29/52; B01D 29/56; B01D 29/60; B01D 29/606; B01D 29/608; B01D 29/66;
(Continued)

(56) References Cited

U.S. PATENT DOCUMENTS 3,542,197 A * 11/1970 Rosaen ................. B01D 29/54
210/108
5,846,420 A 12/1998 Bolton et al.
(Continued)

FOREIGN PATENT DOCUMENTS

| DE | 10 2011 100 518 | 11/2012 |
|---|---|---|
| WO | 2012/150011 | 11/2012 |

OTHER PUBLICATIONS

International Search Report (ISR) dated May 31, 2016 in International (PCT) Application No. PCT/EP2016/000317.

*Primary Examiner* — Patrick Orme
(74) *Attorney, Agent, or Firm* — Wenderoth, Lind & Ponack, L.L.P.

(57) ABSTRACT

A system for filtering fluids includes a primary filter (2) having at least one filter element that can be penetrated in one direction during the filtration process and can be penetrated in the opposite direction for a backflushing process. An aftertreatment device (36) is mounted downstream of the primary filter (2) for the backflushed quantities discharged by the primary filter to be processed and includes at least one filter chamber (11) that holds the backflushed quantities and that has a fluid inlet, a fluid outlet and at least one aftertreatment filter element (19). A control device (9) delivers one portion of the backflushed quantity at a time to the associated aftertreatment filter element (19).

19 Claims, 7 Drawing Sheets

(52) U.S. Cl.
CPC ...... *B01D 2201/08* (2013.01); *B01D 2201/16* (2013.01)

(58) Field of Classification Search
CPC .... B01D 29/665; B01D 29/92; B01D 29/925; B01D 35/12; B01D 2201/08; B01D 2201/165; B01D 2201/167
See application file for complete search history.

(56) References Cited

U.S. PATENT DOCUMENTS

| | | | |
|---|---|---|---|
| 2003/0168402 A1* | 9/2003 | McKay | B01D 17/00 210/512.1 |
| 2005/0170492 A1* | 8/2005 | Johnson | B01D 17/0202 435/287.1 |
| 2014/0091021 A1 | 4/2014 | Wnuk et al. | |
| 2014/0202938 A1* | 7/2014 | Wnuk | B01D 29/52 210/108 |

* cited by examiner

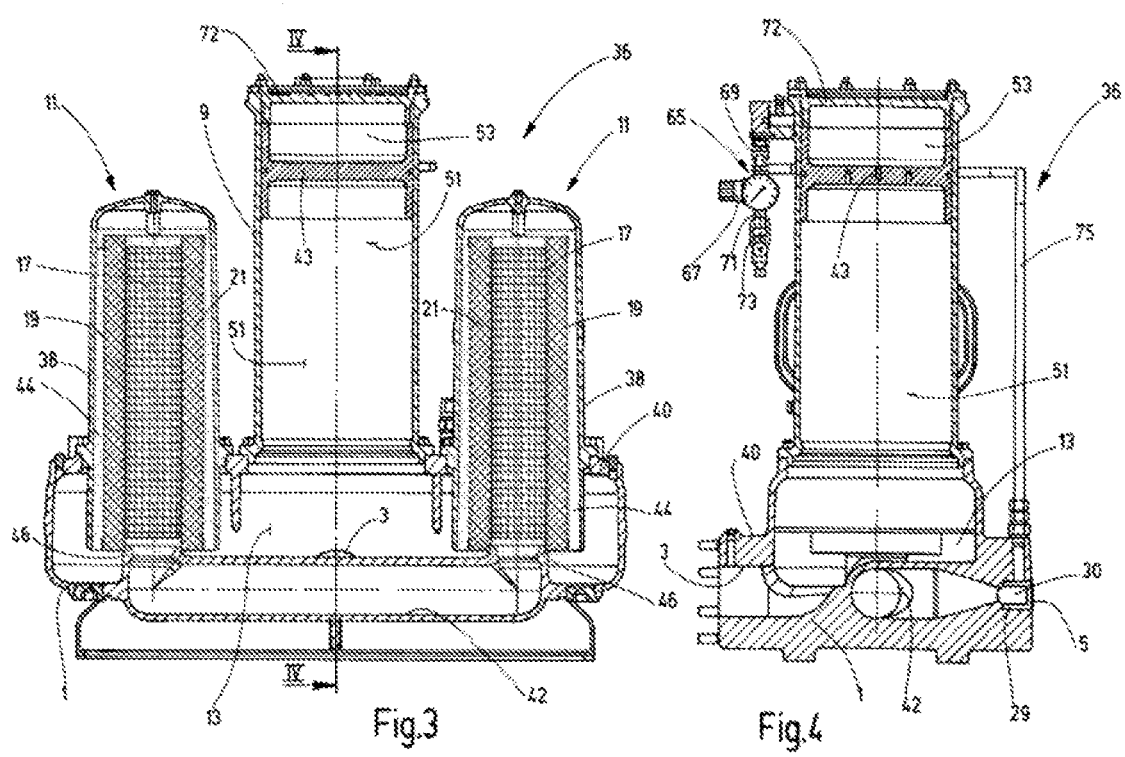

SYSTEM FOR FILTERING FLUIDS

FIELD OF THE INVENTION

The invention concerns a system for filtering fluids, comprising a primary filter provided with at least one filter element that allows flow-through in one direction during the filtration process, and allows flow-through in the opposite direction for a backflushing process. A post-treatment device is disposed downstream of the primary filter for treating the backflushed volumes that are discharged by the primary filter.

BACKGROUND OF THE INVENTION

To be able to provide a reliable and efficient operation of filtration plants over extended operating periods, it is common, particularly with larger plants, to backflush to regenerate the filter elements used in the filtration process. During such backflushing phases, the filter element to be cleaned is subjected to a partial flow of the filtrate in the opposite direction to dislodge any contaminants from the element and to dispose of the contaminants together with the outflowing backflush volume. In view of the extreme environmental hazard of the contaminated backflushed fluid, the disposal thereof poses a problem. At least for larger volumes of flushing fluid, some post-treatment or processing is required, such as filtration of incinerable contaminants. When filtering heavy fuel oils, such as those used to operate large diesels like marine diesel engines, the high viscosity of the heavy fuel oil hinders not only the backflushing process in the primary filter, but also the filtration process, which must be carried out for processing by the post-treatment device disposed downstream of the primary filter. In order to ensure an efficient backflushing action at the primary filter, even with fluids of higher viscosity, the prior art according to the documents DE 10 2011 100 518 A1 or WO 2012/150011 A1 uses a certain quantity of flushing fluid from a piston accumulator for a respective backflushing process. The piston accumulator is subjected to a media pressure so as to pass the backflush volume under pressure through the respective filter element to be backflushed for dislodged contaminants to be flushed out even if the viscosity of the backflush fluid is high.

SUMMARY OF THE INVENTION

In view of the problems described above, an object of the invention to provide an improved filtration system that not only ensures, with fluids of higher viscosity, an efficient backflushing action at the primary filter, but also an effective treatment of the backflush volume discharged from the primary filter.

According to the invention, this object is basically met by a filtration system that uses a control device for feeding the respective backflush volume in batches to an associated post-treatment filter element. This control device allows adapting the post-treatment filtration optimally to the characteristic of the backflush volume, such as viscosity and/or type of contamination. Not only can an effective backflush action can be achieved, but also a reliable treatment of the accruing backflush fluid can be achieved.

In advantageous exemplary embodiments, the control device comprises a control chamber with first and second fluid compartments. The first fluid compartment serves to receive the respective backflush volume. A compressed gas, in particular in form of compressed air, is applied to the second fluid compartment at a predetermined working pressure. Thus, the filter material of the respective post-treatment filter element allows flow-through by a backflush volume under a predetermined pressure. Depending on the type and viscosity of the backflush fluid, the working pressure in the second fluid compartment can be adjusted to a value that is optimal for a post-treatment filtration process. Even in heavy oil applications, such as with marine diesel engines, the treated flushing oil that is obtained as filtrate is then largely free of contaminants.

The first and the second fluid compartment of the control chamber are advantageously separated by a separating piston. Due to the separation, the flushing oil is neither enriched by the working gas nor is it cooled down by the introduction of the gas. This separation ensures that a large part of the flushing oil, treated by the post-treatment device, can be returned to the unfiltrate side of the primary filter, which contributes to a reduction in fuel consumption of a respective ship. This return also means that a smaller quantity of flushing oil is left over, which has to be collected in the ship and disposed of in port.

In advantageous exemplary embodiments, a valve control system, in particular an electrically controlled 3/2-way valve, which has a compressed gas connection to the second fluid compartment of the control chamber, is provided for the supply and discharge of the compressed gas into and out of the second fluid compartment of the control chamber.

With the movement of the separating piston controlled in this manner, the first fluid compartment of the control chamber may have a permanent fluid connection with the unfiltrate side of the respective filter element within the filter chamber. The filtrate side, which is separated from its unfiltrate side via the respective filter element, has at least sometimes a fluid connection with the fluid outlet.

In a particularly advantageous manner, a further valve control device may be connected between the filtrate side of the respective filter element within the filter chamber and the fluid outlet into the respective fluid connection, in particular in form of a preferably spring-loaded non-return valve. This valve prevents the post-treatment device from running dry.

A further, third valve control device may be present with particular advantage on the side of the fluid inlet, which valve control device controls the intake of the respective backflush volume coming from the primary filter and into the post-treatment device. A motorised valve may be advantageously provided in this instance. If the post-treatment device is disposed downstream of a primary filter, as is disclosed in DE 10 2011 100 518 A1, the motorised valve, which in the description is referenced with the number 31 and which is arranged on the backflush volume outlet of the primary filter, can form the valve control device at the fluid inlet.

From a design point of view, the post-treatment device may be made such that, seen in fluid flow direction, the control chamber is disposed upstream of the filter compartment with the respective filter element, or that the filter chamber with the respective filter element is disposed concentric to the control chamber and encloses the same.

With particular advantage, an energy store, preferably in form of a tension spring, is attached to the separating piston. The energy store passes through the second fluid compartment of the control chamber. To initiate a treatment filtration process, the separating piston may be moved by the tension spring in a direction that enlarges the volume of the first fluid compartment, so that a kind of suction effect is generated in the control chamber and in the filter chamber, and the control chamber is filled with a backflush volume that is released from the primary filter located upstream. After subsequent pressure application to the separating piston, the post-treatment filtration process can then take place at the predetermined, optimal pressure level.

In particularly advantageous exemplary embodiments, the post-treatment device is provided with a connector, which may be connected to the primary filter. That connector is provided with a fluid inlet for backflushing volumes and a fluid outlet for post-treated backflushing volumes. The connector acts as a support for the control chamber and for two of its associated filter chambers, which are disposed on either side of the control chamber in such a way that, within the connector, the first fluid compartment of the control chamber is permanently connected to the unfiltrate side of each of the filter chambers, and the filtrate sides of each of the filer chambers is at least sometimes connected to the fluid outlet inside the connector. With a compact design that uses two filter chambers that can be operated together due to the control chamber being disposed between them, a particularly large filter surface is available for an efficient treatment of even larger accruing backflush volumes.

In applications for fluids with a high viscosity, such as heavy oils, a heating device and/or an electronic pressure and/or temperature measuring device is preferably disposed at least in the fluid connection area between the control chamber and the filter chamber. Depending on temperature and viscosity of the backflush volume coming from the primary filter, a suitable temperature as well as the working pressure of the control chamber can be adjusted for the optimal filtration process.

With particular advantage, the post-treatment device may be connected to the primary filter such that the fluid quantity accrued at the fluid outlet of the post-treatment device may be recirculated to the unfiltrate side of the primary filter, forming a closed circuit. The recirculation is particularly advantageous, especially with heavy oil marine applications, where the flushing oil accrued during treatment is required to be collected in the ship. Due recirculating a large part of accruing flushing oil, through which the fuel consumption of ships may be indirectly lowered, less flushing oil is left over, which eventually has to be disposed of in port.

Another object of the invention concerns an improved post-treatment device for flushing oil, which is preferably a component of a filtration system.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure:

FIG. 3 is a side view in section of the post-treatment device of the embodiment in FIGS. 1 and 2 taken along line III-III of FIG. 2;

FIG. 4 is an end view in section of the post-treatment device of FIGS. 1 and 2 taken along line IV-IV of FIG. 3;

DETAILED DESCRIPTION OF THE INVENTION

Figure 1:
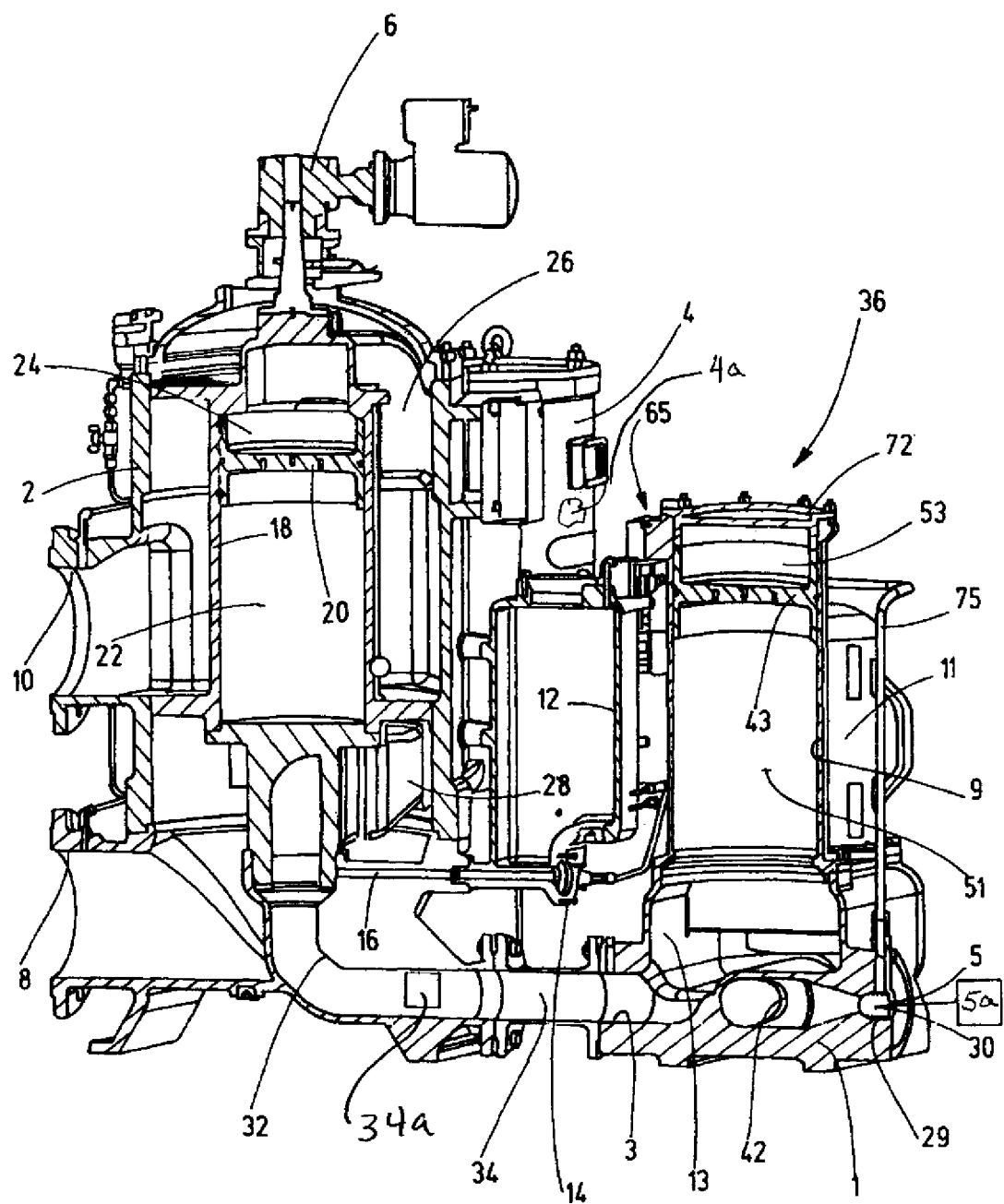
FIG. 1 is a perspective view, schematically simplified, in partial section of a filtration system according to a first exemplary embodiment of the invention.
Figure 2:
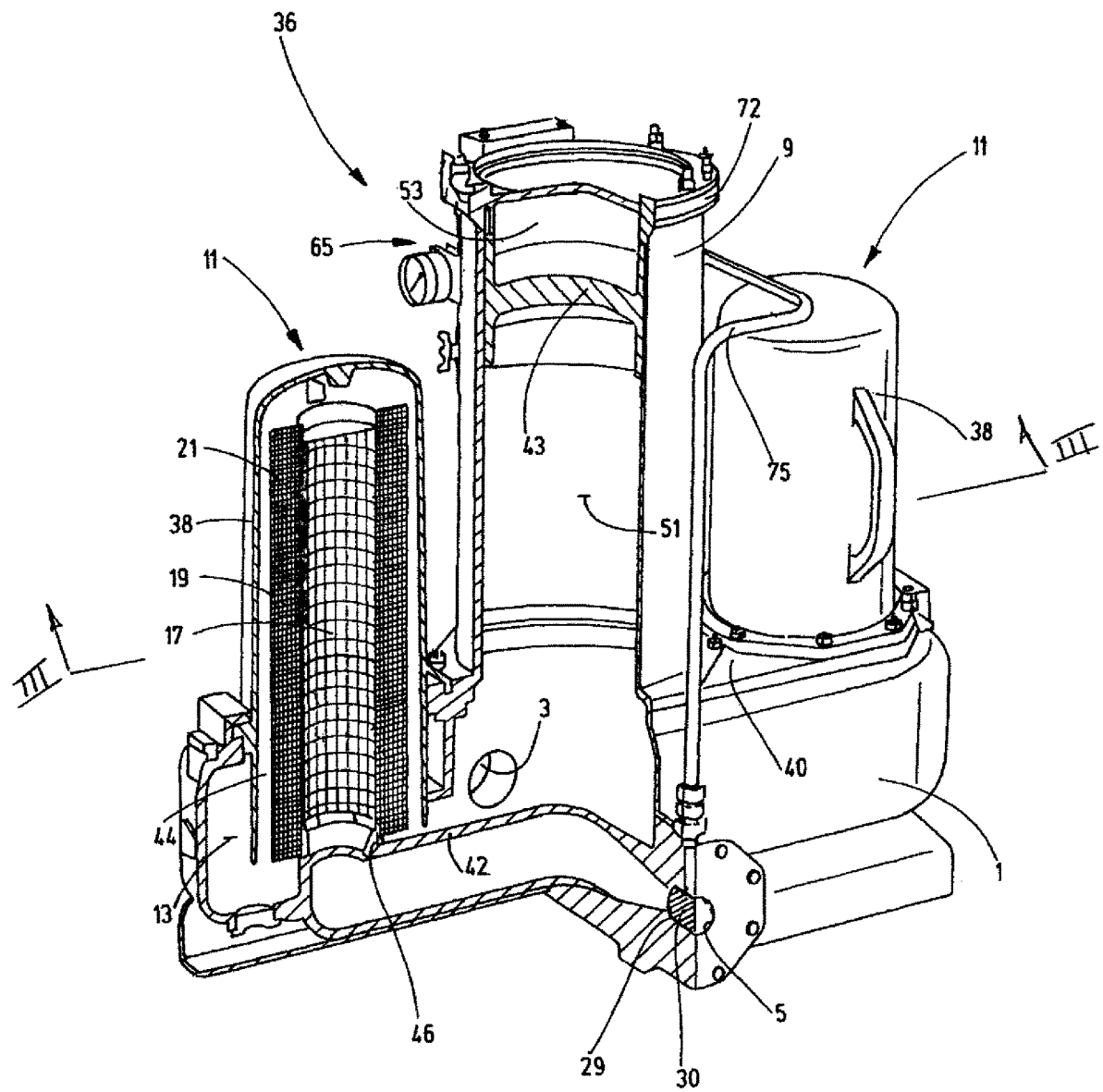
FIG. 2 is a perspective view in partial section separately showing the post-treatment device of the embodiment in FIG. 1.

In the first exemplary embodiment of the system according to the invention, shown in FIGS. 1 to 4, the main housing 2 of the primary filter in FIG. 1, corresponds to the backflush filter device, which is described in the aforementioned document WO 2012/150011 A1 and to which reference is made. The simplified representation of FIG. 1 does not show all details of this known device, but only those details of the backflush filter device that are significant for understanding the system according to the invention, where the primary filter is part of the system according to the invention. Other and different types of backflush filter devices may be used as primary filters, for example, the device disclosed in the already mentioned document DE 10 2011 100 518 A1.

Arranged on main housing 2 are located on an inlet 8 for unfiltrate to be cleaned and an outlet 10 for cleaned fluid are located. Element chambers 4 on the outside of housing 2, with each inherent chamber containing one primary filter element 4a, which may be backflushed. To generate a pneumatically supported backflush flow, a backflusher with a hydro-pneumatic piston accumulator 18 is provided in main housing 2. The piston 20 of the piston accumulator separates a gas side 22 from a fluid side 24. FIG. 1 depicts the piston 20 in a position in which it is driven upwards through compressed air. The compressed air is provided at the gas side 22 from a backflush gas tank filled with compressed air via membrane valve 14 and a backflush gas line 16. This movement the piston 20 transfers the filtrate, previously located in fluid side 24, as pressurised backflush fluid via a backflush line 26 to a chamber connection (not shown) of a selected element chamber 4 of the filter element to be backflushed. The element chamber 4 that is to be backflushed is selected through setting the rotary position of the piston accumulator 18 by a rotary drive 6 that is assigned to it. The backflush volume with the dislodged contaminants exits the clean-side chamber connection 28 from element chamber 4 and leaves the primary filter via a backflush outlet 32, from where it flows via a pipe connector 34 to the fluid inlet 3 of the associated post-treatment device 36.

The main body of the post-treatment device 36 is formed by a connector 1, which form the support for two post-treatment filter chambers 11 as well as a control chamber 9, which forms the post-treatment control device. The control chamber 9 is disposed in the central area of connector 1 between the two filter chambers 11 at the upper end of connector 1. Like the chamber housing 38 of the filter chambers 11, the control chamber 9 is flange-mounted on the upper cover wall 40 of connector 1 in such a way that control chamber 9 and chamber housing 38 of the filter chambers 11 are open towards the inner hollow space located under the cover wall 40. The hollow space forms a continuous passage 13 inside connector 1 between the filter chambers 11 and the control chamber 9. Flush with the longitudinal axis of control chamber 9, the fluid inlet 3 feeds into the passage 13. The fluid inlet 3 is connected via the pipe connection 34 to the backflush outlet 32 of the primary filter. The pipe connection 34 contains a valve control device, for example in form of a spring-loaded non-return valve 34a, which opens during the backflush process due to the pressure of the backflush volume supplied by the piston accumulator 18. Alternatively, the pipe connection 34 may be provided with a motorised ball valve, for example the ball valve 53 of the primary filter described in the cited document WO 2012/150011 A1.

As is clearly visible from FIG. 3, an internal pipe 42 extends in a horizontal direction in the bottom section of the inner space of the connector 1 between the filter chambers 11. Located at both ends of the internal pipe 42 is an opening, the edge of which forms an element seat 46, on which a filter element 19, which is located in the associated filter chamber 11, is seated in such a way that the inner hollow filter space 17 of each filter element 19 is in fluid connection with the inner pipe 42. In the process of treatment filtration in which the filter material 21, which surrounds the inner hollow space 17, is subjected a flow from outside to the inside, the internal pipe 42 forms the filtrate side of the post-treatment filter element 19, from which the treated backflush volume flows to the fluid outlet 5, where a non-return valve 29 with a closing means or closer 30 is disposed. In order to prevent the system from running empty, the non-return valve 29 may be slightly pre-tensioned into the closed position.

The control chamber 9, which is flange-mounted to the cover wall 40 of the connector 1, is formed by a circular cylinder that forms, in conjunction with a longitudinally moveable separating piston 43 inside that cylinder, a hydro-pneumatic piston accumulator. The accumulator is closed at the upper end by a lid 72. The separating piston 43 separates a first fluid compartment 51, which is connected to channel 13 inside the connector 1 and holds a backflush volume that flows in from the fluid inlet 3, from a second fluid compartment 53, which is provided for a pressure medium, in the present instance compressed air, that may be applied to the separating piston 43. Disposed on lid 72, which closes the second fluid compartment 43, is a valve control device 65 with which the pressure level in the second fluid compartment 53 of the control chamber 9 can be regulated, so that subsequent treatment filtrations take place in batches. Each batch with a backflush volume is provided by the control chamber 9 through the stroke movements of piston 43. These stroke movements are generated by a working pressure that is present in a second fluid compartment 53.

The valve control device 65 is for this purpose provided with an electrically controllable 3/2-way valve 67. Valve 67 has a first connection 69 that leads to the second fluid compartment 53 of the control chamber 9. A second connection 71 of the valve 67 leads, via an adjustable air regulator 73, to the flushing gas tank 12 (FIG. 1) of the primary filter. The flushing gas tank serves as the source for compressed air. A pressure relief line 75, which leads to fluid outlet 5 and is connected to line 69, provides for pressure relief of the second fluid compartment 53.

The following operating sequence is achieved with this design:

In the starting state shown in FIGS. 1 to 4, in which the second fluid compartment 53 of the control chamber 9 is pressure-relieved via line 75, the backflush volume that flows into the first fluid compartment 51 from channel 13 has moved the piston 43 into the upper end position as shown. To initiate a treatment process, the valve 65 is switched into a position where compressed air flows in and applies pressure on the separating piston 43 so that it moves downwards. The backflush volume that is located in the first fluid compartment 51 is then pushed out and flows via channel 13 and the open ends of the filter chambers 11 to the unfiltrate side 44, which is located between the outside of the filter material 21 of the filter elements 19 and the chamber wall 38 of the associated filter chamber 11. As a result of the unfiltrate pressure generated by the piston accumulator, the non-return valve disposed in pipe connection 34 has closed, or a possibly provided motorised valve was closed after completion of a backflush process of the primary filter. The treatment filtration process then takes place under the filtration pressure generated by the working pressure in the second fluid compartment 53 of control chamber 9. With the non-return valve 29 open, the resulting filtrate flows away via the inner pipe 42 from the inner hollow spaces 17 of the filter elements 19 that form the filtrate sides back to a primary filter via connection 5a. As shown most clearly in FIG. 3, the chamber housings 38 of the filter chambers 11 have, in the direction of their closed upper end, a slightly conically reducing shape, so that the flow cross-section of the unfiltrate side 44 is reduced from the lower inlet location towards the top, which, to provide a homogenous flow through the filter material 21, results in advantageous flow conditions.

Figure 5:
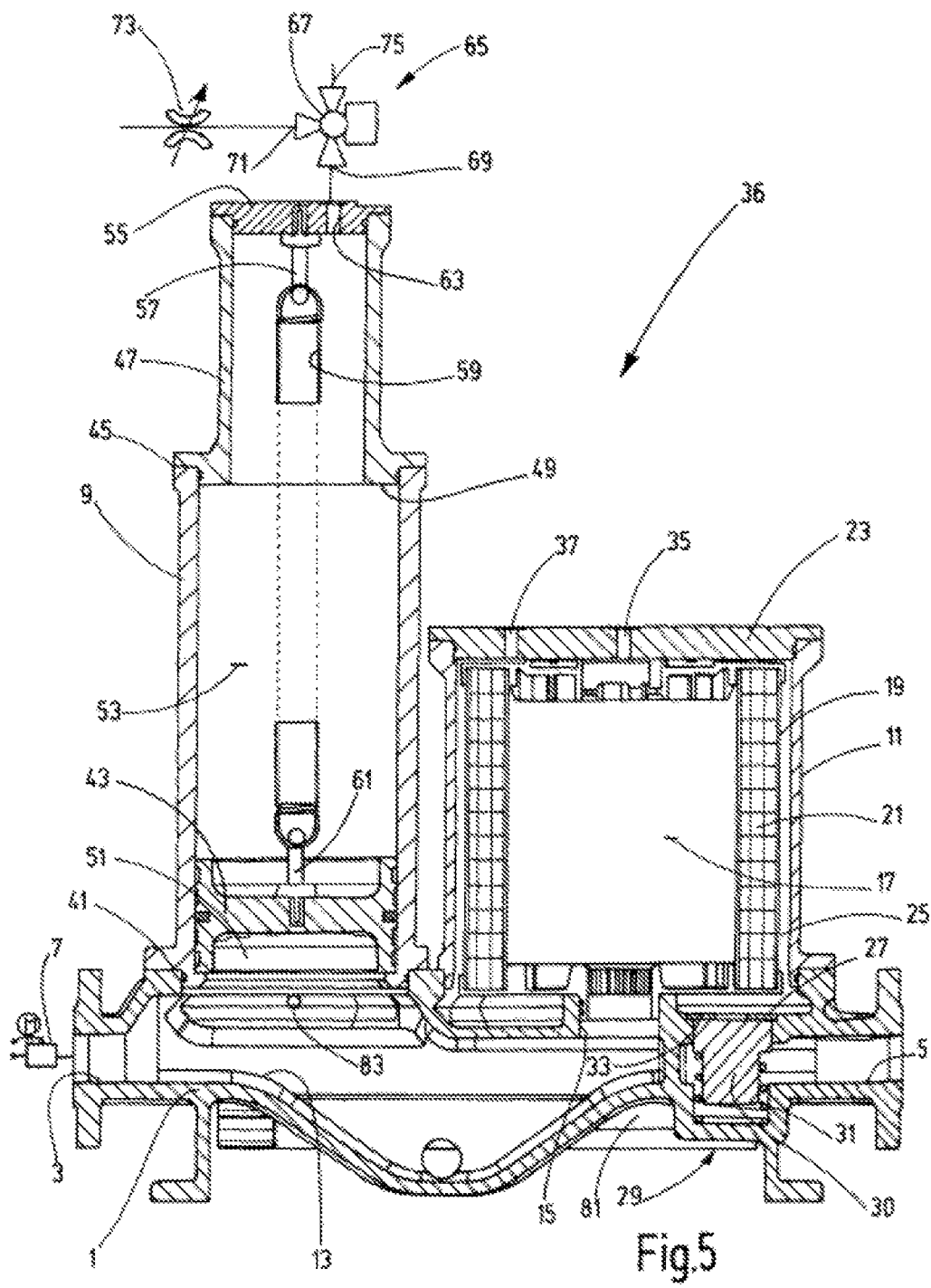
FIG. 5 is a slightly schematically simplified side view in section of the separately shown post-treatment device according to a second exemplary embodiment of the system according to the invention, wherein the starting state prior to the initiation of a treatment process is shown.
Figure 6:
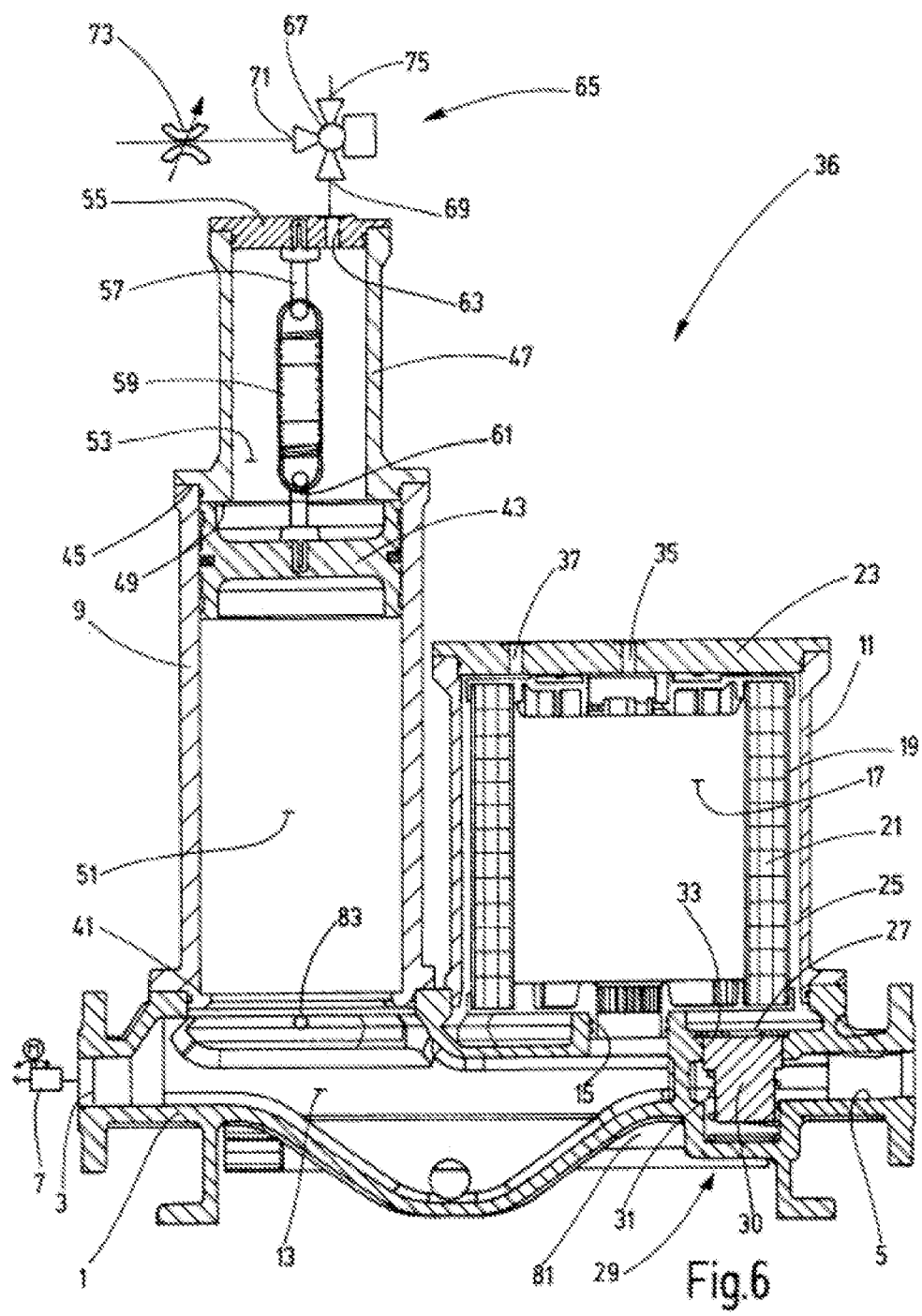
FIG. 6 is a side view in section of the post-treatment device of FIG. 5, wherein the state at the beginning of a treatment process is shown.
Figure 7:
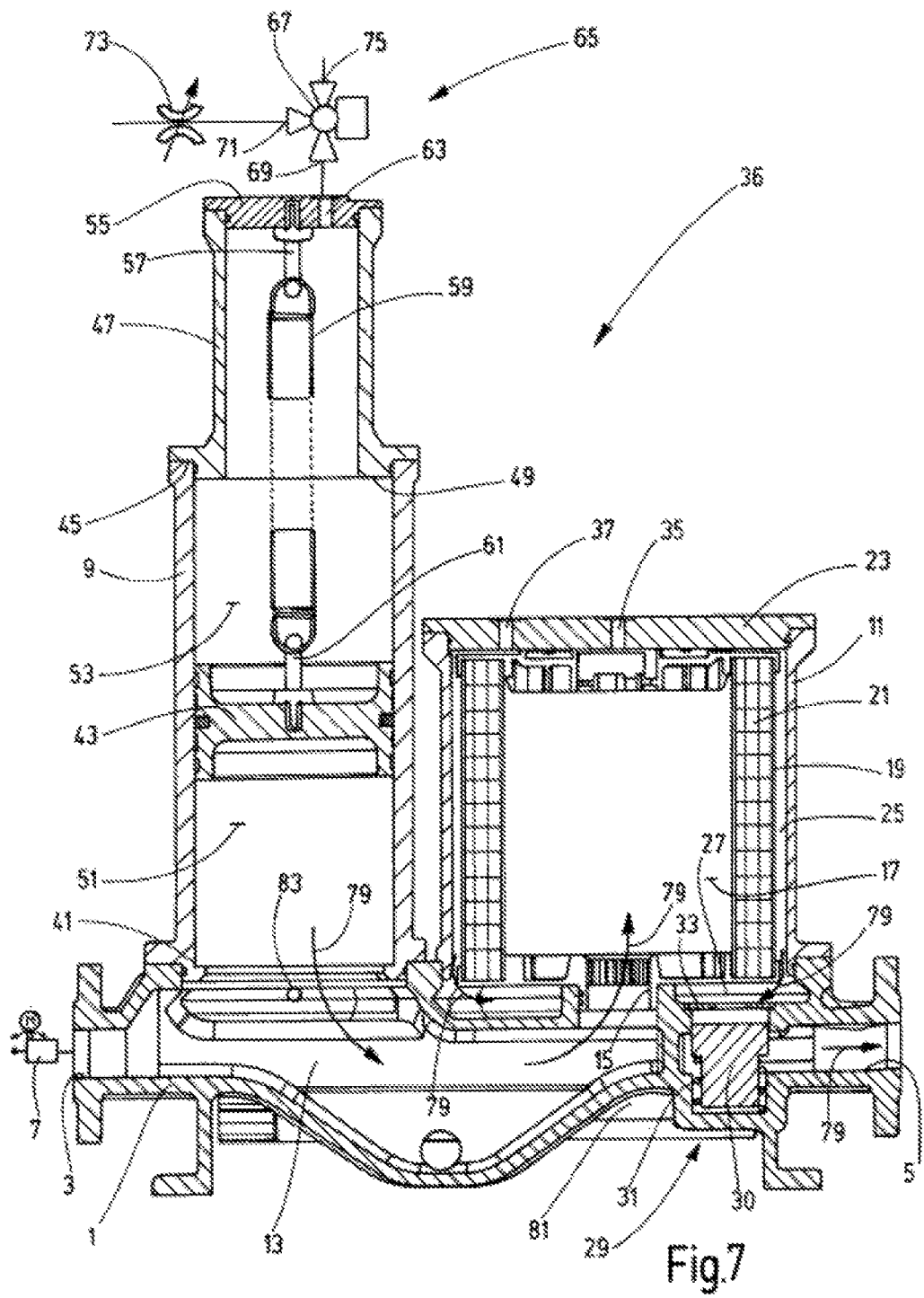
FIG. 7 is a side view in section of the post-treatment device of FIGS. 5 and 6, wherein the state during the treatment process is shown.

The FIGS. 5 to 7 depict a post-treatment device 36 of a second embodiment of the system according to the invention. In this example the control chamber 9 is located at the top of connector 1 in the vicinity of the fluid inlet 3. The only one filter chamber 11 is relocated on the connector 1 to the fluid outlet 5, which is located at the end of the connector 1 that is opposite the fluid inlet. Located upstream of fluid inlet 3 is a motorised valve 7, indicated in form of a symbol, which may be the motorised valve located at the backflush outlet 32 of the primary filter, which valve is designated with the reference number 53 in the mentioned document WO 2012/150011 A1. As with the first embodiment, in connector 1 a channel 13 follows on from the fluid inlet 3, extends in the direction of the fluid outlet 5, ends at a distance from fluid outlet 5 in the central part of the filter chamber 11 and forms at that end an inlet 15. Inlet 15 forms a fluid path into the inner hollow filter space 17 of the filter element 19 that is located in the filter chamber 11. The filter element 19, which surrounds the inner hollow space 17 with its filter material 21 that forms a hollow cylinder, is insertable and/or exchangeable via a removable housing lid 23 in the filter chamber 11.

The space 25, which forms the filtrate side in the treatment filtration process and which surrounds the filter material 21, is in fluid connection with the fluid outlet 5 via a longitudinal channel 27. Channel 27 extends in the area of the filter chamber 11 along the upper side of the connector 1. The opening or closure of this connection can be facilitated via a further valve control device, which is implemented in the present example by a non-return valve 29. Valve 29 is spring-controlled and is provided with a closing means or closure 30 that is pre-tensioned into a closed position, as shown in FIG. 5, by a closing spring 31. The closing means 30 makes contact with a valve seat 33 and closes its opening. The non-return valve 29 is set to an approximate opening pressure of 0.5 bar, so that a corresponding small pre-tension pressure remains in the fluid system to prevent it from running empty. To facilitate the filling process of the device, a vent hole 35 is provided in the housing lid 23 that ends in the hollow filter space 17 that forms the unfiltrate side. A vent hole 37 is provided that ends in the filtrate space 25. The usual venting devices associated with the bore holes 35, 37 are not shown.

The main component of the control chamber 9 is a circular cylinder, which is flange-mounted with its lower end 41, when viewing the drawing, on the connector 1 in the vicinity of the fluid inlet 3 and is open to channel 13. The cylinder, together with the separating piston 43 that can move in it longitudinally, forms a hydro-pneumatic piston accumulator. The accumulator is closed at the upper end 45 of the cylinder by dome 47 that has a reduced diameter. The lower end of the dome 47 forms at the end 45 of the cylinder an end stop surface 49 to limit the movement of the separating piston 43 upwards, as shown in the drawing. Inside the cylinder and the dome 47, the separating piston 43 separates a first fluid compartment 51, which is connected to channel 13 and takes up the backflush volume that flows in from the fluid inlet 3, from a second fluid compartment 53, which is provided for a pressure medium, in this instance compressed air, with which to apply pressure to the separating piston 43. At the dome upper end, the dome 47 is closed through a closing plate 55. At the inside of closing plate 55 an anchor 57 for a tension spring 59 is disposed. The lower end of spring 59 is attached via an anchor 61 to the separating piston 43. Spring 59 pre-tensions piston 43 for a movement in which the volume of the first fluid compartment 51 is enlarged. A connection point 63 is disposed on the closing plate 55 for the valve control device 65, with which the pressure level in the second fluid compartment 53 of the control chamber 9 may be controlled in such a way that subsequent treatment filtrations take place in batches, each with a backflush volume, which is provided by the control chamber 9 in accordance with the stroke movements of the separating piston 43.

Like in the first embodiment, the valve control device 65 comprises an electrically controllable 3/2-way valve 67 from which a connecting line 69 leads to the connection point 63 at the control chamber 9. A second connecting line 71 leads via an adjustable air regulator 73 to a source for compressed air. A third connecting line 75 of valve 67 provides for pressure relief to the outside.

FIG. 5 depicts the starting state in which the channel 13 and the filter chamber 11 are filled with unfiltrate and are vented by means of bore holes 35 and 37. The second fluid compartment 53 is filled with compressed air via valve 67 so that pressure is applied to the separating piston 43 and is then retained in the lower position, as shown in FIG. 5, against the force of the extended tension spring 59. If backflushing is triggered in the upstream primary filter, the position of the 3/2-way valve 65 is changed, with the motorised valve 7 open, so as to discharge the compressed air from the second fluid compartment 53. The tension spring 59 now pulls the load-free separating piston 43 into the upper position, as shown in FIG. 6, so that a suction effect is created causing a backflush volume to flow in without opposing pressure via the fluid inlet 3. When reaching the upper end position of the separating piston 43, see FIG. 6, the filter chamber 11 as well as the cylinder of the control chamber 9 are filled with backflush fluid. With the motorised valve 7 now closed, the valve 65 is switched into a position where compressed air flows in via the air regulator 73 and applies a load on separating piston 43 in such a way that it moves downward against the force of the tension spring 59. For the treatment filtration process, the quantity of backflush fluid that remains in the cylinder of the control chamber 9 is pushed out as a result, as shown in FIG. 7, and is fed via channel 13 and the inlet 15 to the filter chamber 11. The filtrate obtained after flowing through the filter material 21 flows away from the filtrate compartment 25, which surrounds the filter element 19, to the longitudinal channel 27. Since the filtration process takes place under the filtration pressure that is generated by the working pressure in the second fluid compartment 53 of the control chamber 9, the non-return valve 29 opens the connection to the fluid outlet 5. The flow sequence that occurs during the filtration process is indicated in FIG. 7 with flow arrows.

As in the first embodiment, through adjusting the pressure level of the compressed air in the second fluid compartment 53 and through adjusting the movement speed of the separating piston 43 by the air regulator 73, the filtration pressure may be set for the optimal adaptation according to the nature and viscosity of the backflush fluid. For highly viscous fluids, such as heavy oil, it is possible to raise the temperature by a heating element 81 that is in heating contact with channel 13. Electrical power to the heating element 81 may be provided, or a supply of available process steam. To achieve optimal pressure and temperature settings, it is possible to provide an electronic pressure and temperature sensor 83 that is in contact with the fluid in the channel 13.

Figure 8:
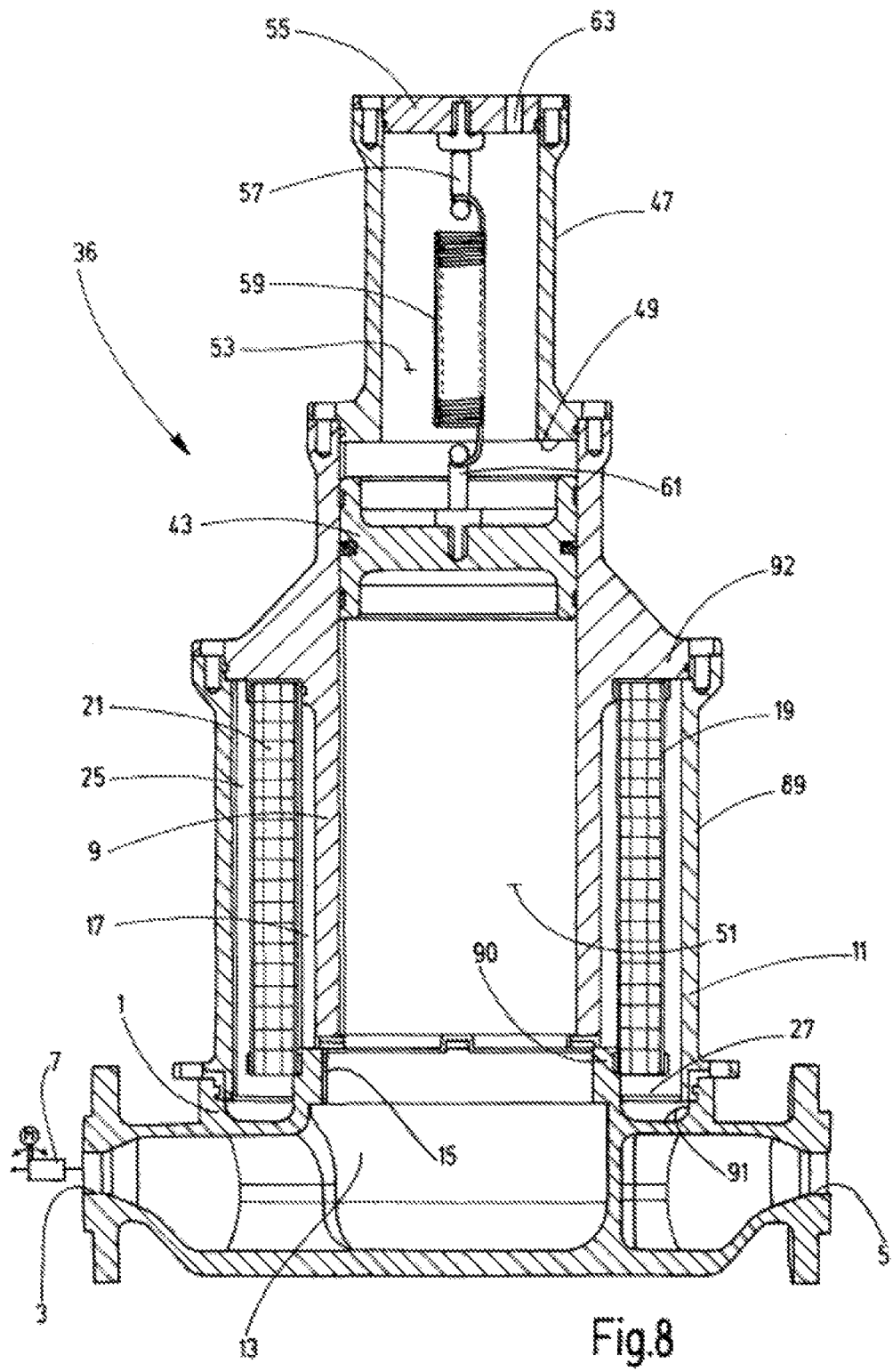
FIG. 8 is a schematically simplified, side view in section of a third exemplary embodiment of the post-treatment device of the system according to the invention, wherein, as in FIG. 5, the state at the beginning of a treatment process is shown.

The FIG. 8 depicts a modified or third exemplary embodiment in which the functionality is identical to that of the previously described second exemplary embodiment. The 3/2-way valve 67 at the connection point 63 of the dome 47 has been omitted in the drawing, as well as the non-return valve 29 associated with the fluid outlet 5. The difference compared to the second exemplary embodiment lies in the fact that the control chamber 9 is disposed coaxially inside the filter chamber 11. The filter chamber 11 comprises a circular cylinder 89, which is flange-mounted to connector 1, centrally between its fluid inlet 3 and fluid outlet 5. The inlet 15 extends from channel 13 into the inner hollow filter space and forms on the outside of its raised rim 90 the element seat for the lower end of the filter element 19. The hollow cylinder-shaped filter material 21 of filter element 19 separates the inner hollow space 17, which holds the unfiltrate, from the filtrate space 25, which is located between the outside of the filter material 21 and the cylinder 89. Like in the previous exemplary embodiment, the filtrate space 25 is connected, via a longitudinal channel 27 and an outlet opening 91 that is located thereon, to the fluid outlet 5. The cylinder 89 of the filter chamber 11 is closed at the upper end by a flange 92 of the cylinder of the control chamber 9. Extending away from flange 92, the cylinder extends to just before the raised rim 90 at the inlet 15, leaving a gap for the fluid connection to the space 17 that forms the unfiltrate side. As in the previous exemplary embodiment, a dome 47 forms again the upper end of the control chamber 9 as well as the end stop surface 49 as end stop for the separating piston 43. As before, the closing plate 55 of the dome 47 is provided with anchor 57 for the upper end of the tension spring 59 as well as the connection point 63 for the valve control device 65 comprising the 3/2-way valve 67.

While various embodiments have been chosen to illustrate the invention, it will be understood by those skilled in the art that various changes and modifications can be made therein without departing from the scope of the invention as defined in the claims.

The invention claimed is:
1. A system for filtering fluids, the system comprising:
   a primary filter element being capable of allowing fluid flow-through in one direction during a filtration process and in an opposite direction for a backflushing process and being in a primary filter chamber;

a post-treatment device connected in fluid communication with said primary filter element downstream of said primary filter element that treats backflush fluid volumes discharged from said primary filter, said post-treatment device including a filter chamber that receives the backflush volumes, a fluid inlet with an inlet valve upstream of said fluid inlet, a fluid outlet, a post-treatment filter element and a control regulating supplying the backflush fluid volumes in separate batches to said post-treatment filter element, said control including a post-treatment accumulator having a control chamber with first and second fluid compartments separated by a separator in said control chamber, said post-treatment accumulator being in fluid communication between said inlet valve and said post-treatment filter element, said first fluid compartment being in fluid communication with said fluid inlet and receiving backflush fluid volumes and being in fluid communication with an unfiltrate side of said post-treatment filter element without passing through said primary filter element to provide the separate batches to said post-treatment filter element, said second compartment containing a compressed gas at a predetermined working pressure; and a gas control valve with a compressed gas connection being connected in fluid communication with an interior of said second fluid compartment and controlling alternatively supplying and discharging of said compressed gas into and out of said second fluid compartment of said control chamber producing the separate batches supplied to said post-treatment filter element.

2. A system according to claim 1 wherein
said compressed gas is compressed air.

3. A system according to claim 1 wherein
said separator is a separating piston that separates said first and second fluid compartments in said control chamber.

4. A system according to claim 3 wherein
an energy store is attached to said separating piston and extends through said second fluid compartment of said control chamber.

5. A system according to claim 4 wherein
said energy store is a tension spring.

6. A system according to claim 1 wherein
said gas control valve is an electrically controllable 3/2-way valve.

7. A system according to claim 1 wherein
said first fluid compartment of said control chamber is permanently connected in fluid communication to said unfiltrate side of said post-treatment filter element in said filter chamber, a filtrate side of said post-treatment filter element in said filtrate chamber being separated from said unfiltrate side by said post-treatment filter element and being connected to said fluid outlet.

8. A system according to claim 1 wherein
an outlet fluid control valve is connected in fluid communication between a filtrate side of said post-treatment filter element and said fluid outlet.

9. A system according to claim 8 wherein
said outlet fluid control valve is a spring-loaded non-return valve.

10. A system according to claim 1 wherein
an inlet fluid control valve is on a side of said fluid inlet and controls intake of the backflush fluid volumes from said primary filter element into said post-treatment device.

11. A system according to claim 1 wherein
said control chamber is disposed upstream of said filter chamber in a fluid flow direction, said filter chamber being concentric with and enclosing said control chamber.

12. A system according to claim 1 wherein
said post-treatment device comprises a connector coupled to said primary filter element, said connector having said fluid inlet upstream of said post-treatment filter element and said fluid outlet downstream of said post-treatment filter element and supporting said control chamber and said filter chamber, said filter chamber of said post-treatment device and said primary filter chamber being on sides of said control chamber, said first fluid compartment being permanently connected to unfiltrate sides of said filter chamber of said post-treatment device and said primary filter chamber, fluid communication of filtrate sides of said filter chambers being allowed and not allowed to said fluid outlet.

13. A system according to claim 1 wherein
a heater is in a fluid chamber area between said control chamber and said filter chamber.

14. A system according to claim 1 wherein
an electronic pressure sensor is in a fluid connection area between said control chamber and said filter chamber.

15. A system according to claim 1 wherein
an electronic temperature sensor is in a fluid connection area between said control chamber and said filter chamber.

16. A system according to claim 1 wherein
a connection of said post-treatment device and said primary filter element recirculates a fluid quantity accrued at said fluid outlet to an unfiltrate side of said primary filter and forms a closed circuit.

17. A system according to claim 1 wherein
said primary filter is connected in fluid communication to a backflushing accumulator.

18. A post-treatment device for a filtering system, the post-treatment device comprising:
a connector connectable in fluid communication to a primary filter element such that backflush volumes of flushing oil can flow via an inlet of said connector and that can be reverse flushed;
an inlet valve upstream of said inlet;
a filter chamber on said connector;
a post-treatment filter element in said filter chamber;
a control regulating supplying of the backflush volumes in separate batches to said post-treatment filter element, said control including a control chamber with first and second fluid compartments separated by a separator, said first fluid compartment being in fluid communication with said inlet being in fluid communication between said inlet valve and said post-treatment filter element and being in fluid communication with an unfiltrate side of said post-treatment filter element without passing through a primary filter element of the filtering system to provide the separate batches to said post-treatment filter element, said second fluid compartment containing a pressurized gas at a predetermined working pressure; and
a gas control valve with a compressed gas connection being connected in fluid communication with an interior of said second fluid compartment and controlling alternatively supplying and discharging of said compressed gas into and out of said second fluid compartment of said control chamber producing the separate batches supplied to said post-treatment filter element.

19. A system according to claim 18 wherein said separator is a separating piston in said control chamber that separates said first and second fluid compartments and subdivides said control chamber.

* * * * *